Figure 1:
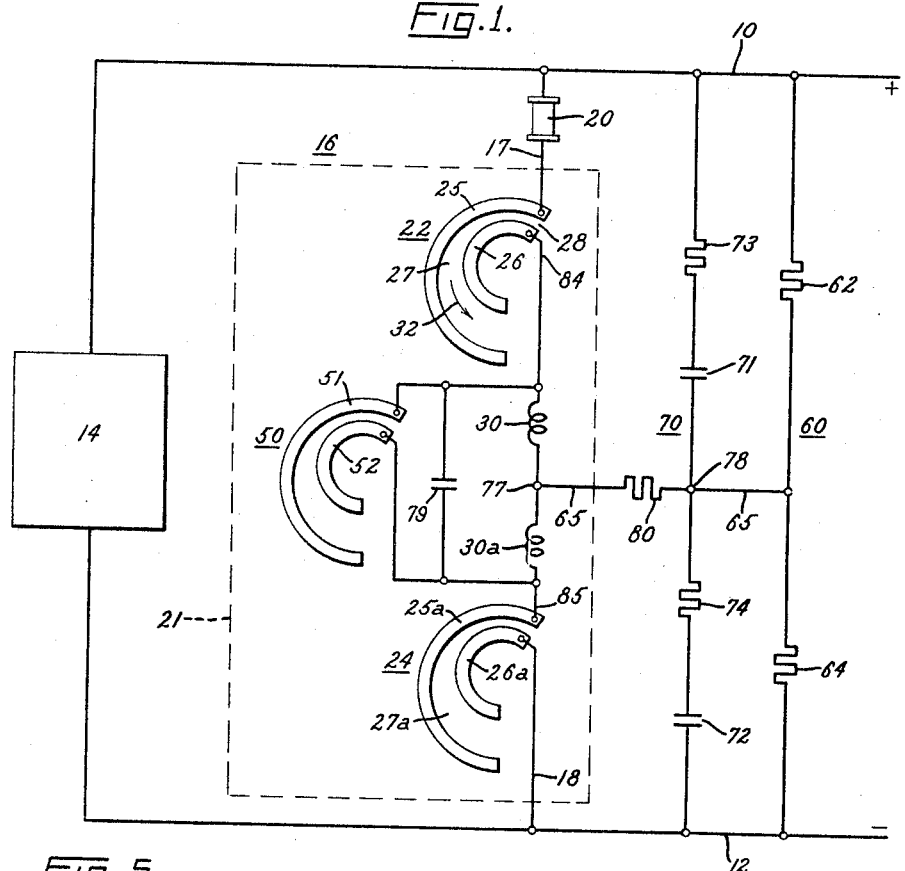

INVENTORS:
THOMAS H. LEE,
TSENG W. LIAO,
BY William Freedman
ATTORNEY

July 16, 1968  T. H. LEE ET AL  3,393,338
SURGE SUPPRESSOR FOR PROTECTING A HIGH VOLTAGE DC POWER CIRCUIT
Filed May 16, 1966  2 Sheets-Sheet 2
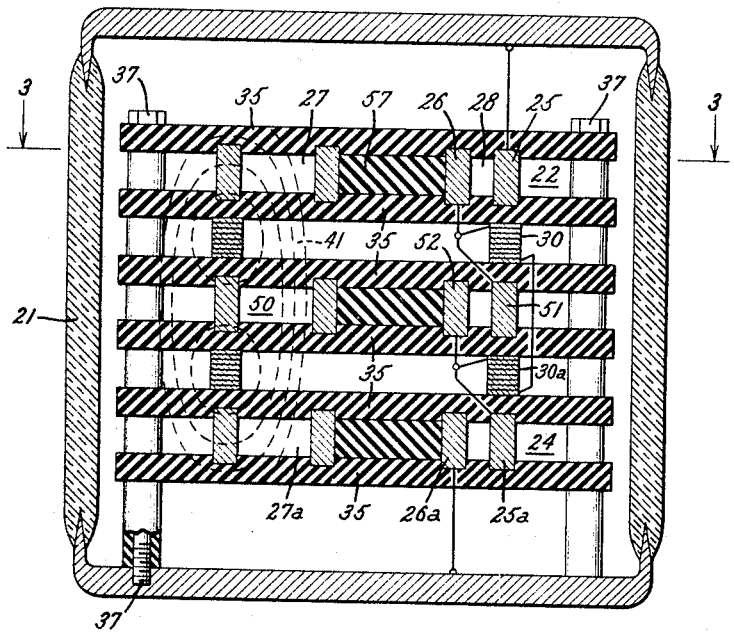
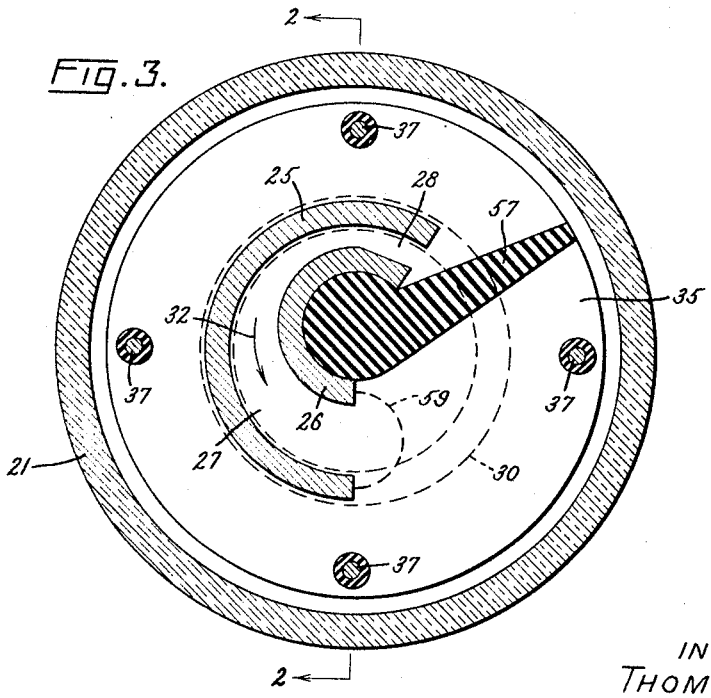
INVENTORS:
THOMAS H. LEE,
TSENG W. LIAO,
BY William Freedman
ATTORNEY United States Patent Office 3,393,338
Patented July 16, 1968

3,393,338
SURGE SUPPRESSOR FOR PROTECTING A HIGH VOLTAGE DC POWER CIRCUIT
Thomas H. Lee and Tseng W. Liao, Media, Pa., assignors to General Electric Company, a corporation of New York
Filed May 16, 1966, Ser. No. 550,369
11 Claims. (Cl. 313—154)

This invention relates to a spark-gap type of surge suppressor for protecting a high voltage DC power circuit against the effects of voltage surges.

The surge suppressor of our invention comprises a plurality of spark gap devices connected in series across the buses of a DC power circuit. To permit the use of a minimum number of these gap devices for protecting a DC circuit of a given voltage, it is desirable that the voltage be distributed substantially uniformly between the gap devices under steady-state conditions.

When a voltage surge appears across the buses, it is desirable that the suppressor consistently arc-over when the voltage exceeds a predetermined value that in some applications, is a relatively small multiple of the steady state voltage, e.g., less than twice the steady-state voltage. To assure consistent and rapid arc-over at this predetermined surge voltage, we alter the voltage distribution under surge conditions, changing it from a substantially uniform to a highly non-uniform distribution. For this purpose, we connect a plurality of capacitors across the respective gap devices, proportioning the capacitors so that a large percentage of the surge voltage initially appears across one of the gap devices. This assures breakdown of the highly-stressed gap device by the surge voltage. When such breakdown occurs, the surge voltage quickly transfers to the remaining gap or gaps. This overstresses the remaining gap or gaps, which quickly arc-over, completing a surge-dissipating path across the buses.

When a plurality of gap devices are connected in series, it is important that the arc initiated at a given gap device upon its arc-over be maintained until all the other gap devices arc-over. This must be in the case because should a gap extinguish its arc before breakdown of the other gaps, it will reassume some of the surge voltage, thus partially relieving the other gaps from voltage stress and decreasing the changes for their breakdown.

An object of our invention is to insure that once a gap arcs-over, it will continue to arc until all the gaps connected in series with it have arced-over.

Another object is to provide the insurance of the preceding paragraph by resistance means connected in circuit with the surge-voltage dividing capacitors in such a manner that the resistance means does not interfere with the ability of the capacitors to divide the surge-voltage in the desired manner.

In carrying out our invention in one form, we provide a surge suppressor that comprises a pair of gap devices connected in series across the opposite polarity buses of a high voltage DC circuit. Surge voltage appearing across the buses is distributed between these gap devices by a voltage divider that comprises a pair of capacitors connected in series with each other across the buses and respectively connected across the gap devices. One of these capacitors discharges through the gap device that it is connected across upon initial arc-over of this gap device. The flow of current through the arced-over gap device is maintained until the other gap device arcs-over by means comprising a damping resistor connected between the juncture of said two gap devices and the juncture of said two capacitors. This damping resistor overdamps the discharge circuit of said one capacitor and thereby eliminates oscillations and resulting current zeros from this discharge current, thus lessening the chances that the arced-over gap device will clear such current. The damping resistor is located out of the path of current flowing through the voltage divider between said buses and also out of the path of current flowing through said gap devices upon their arc-over.

Figure 5:
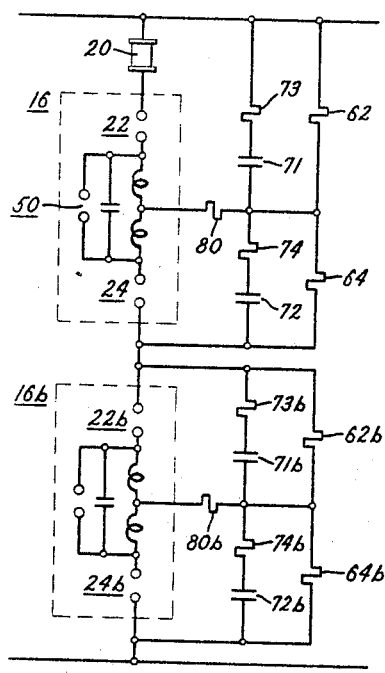
Figure 4:
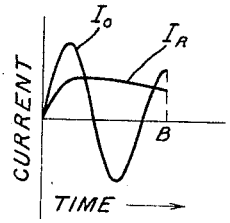
Figure 1A:
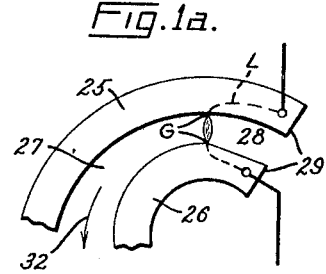

For a better understanding of the invention, reference may be had to the following description taken in connection with the accompanying drawings, wherein:

FIG. 1 is a diagrammatic view of a surge suppressor embodying one form of the invention.
FIG. 1a is an enlarged detailed view of a portion of the suppressor of FIG. 1.
FIG. 2 is a sectional view of the suppressor taken along the line 2—2 of FIG. 3.
FIG. 3 is a sectional view along the line 3—3 of FIG. 2.
FIG. 4 is a graphical representation of certain current relationships in the suppressor.
FIG. 5 shows a modified form of suppressor.

Referring now to FIG. 1, there is shown a high voltage DC circuit comprising a positive bus 10, a negative bus 12, and converter equipment 14 connected to the buses for supplying power thereto or receiving power therefrom. Either of these buses can be constituted by any suitable form of conductor, including, for example, a path through the earth. For various reasons, soon to be explained, voltage surges may appear across the buses 10, 12 that could damage the converter equipment 14 unless suitable protection is provided.

For protecting the converter equipment 14 from such voltage surges, a surge suppressor, schematically shown at 16, is provided. This surge suppressor has one terminal 17 connected to the positive bus 10 and its other terminal 18 connected to the negative bus 12. The connection to the positive bus is through a resistor 20, which is preferably a non-linear resistor made of a material having a negative resistance-current characteristic, e.g., the material sold by General Electric Company under the trademark Thyrite.

The surge suppressor 16, which is shown in greater detail in FIGS. 2 and 3, comprises a sealed envelope 21 containing an arc-extinguishing gas consisting essentially of hydrogen. Disposed within the envelope 21 are two main gap devices 22 and 24 electrically-connected in series. Each of these gap devices comprises a pair of spaced-apart electrodes defining a gap therebetween across which arcs are adapted to be established. The electrodes of the upper gap device are designated 25 and 26 and the gap therebetween 27. The electrodes of the lower gap device are designated 25a and 26a and the gap therebetween 27a.

Since these gap devices are substantially identical, only the upper gap device 22 will be described in detail. Referring to FIG. 3, the electrodes of this gap device are preferably of a generally semi-circular configuration with one electrode 25 disposed about the other electrode 26. The centers of curvature of the two electrodes are offset with respect to each other so that the gap 27 is relatively short in length near one end of the electrodes and gradually incrases in length as the other end is approached via a circumferential path extending along the length of the electrodes.

The region of the gap device near the closely-spaced ends of the electrodes 25 and 26 is referred to as the arc-initiation region and is designated 28. The remainder of the gap device is referred to as the arc-running region since arcs, after being initiated in the arc-initiation region 28, are driven along the electrodes through the arc-running region in the direction of arrow 32, as will soon be explained. The opposed surfaces of the electrodes are occasionally referred to hereinafter as arcing surfaces. These surfaces have arc-initiation portions in the arc-initiation region and arc-running portions in the arc-running region.

Referring to the enlarged view of FIG. 1a, the arcing surfaces of electrodes 25 and 26 are closest together at a point G that is offset from the right-hand end of the electrodes. Due to this minimum electrode-spacing at G, it is at this point G that arcs are initiated across the gap 27. For reducing the time lag of arc initiation at this point G, we rely upon the corona developed at the sharp corners 29 of the two electrodes when an overvoltage appears across the gap. Ultraviolet radiations from this corona discharge are projeced into the gap and against the electrode surfaces at the minimum-spacing point G. Such radiations assure free electrons in the gap for arc initiation with a minimum time lag. It is to be noted that the external electrical connections to the electrodes are located at the extreme right-hand end of the electrodes 25 and 26. Thus, the current path extending through an arc initiated at point G is a loop-shaped path bowing in the direction of the arc-running region. This path is indicated by the dotted-line L of FIG. 1a. The magnetic effect of current flowing through this path is to drive the arc to the left, as indicated by arrow 32, with a force varying directly with the square of the current magnitude. As will be apparent from the above, this magnetic effect is present even when the arc is located at its arc-initiation point G.

For developing a much larger magnetic force that acts in the same direction 32 on the arc, we provide an arc-propelling coil 30. This coil 30 is connected in series with the two electrodes 25 and 26, and its magnetic field acts on the arc in a manner soon to be explained. A similar arc-propelling coil 30a for the lower gap device is connected in series with the electrodes 25a and 26a of the lower gap device.

Referring to FIG. 2, the electrodes 25 and 26 of the upper gap device are mounted between two insulating plates 35 that act as sidewalls for the arcing gap 27 between the electrodes. These insulating plates 35 are substantially imperforate in the region of the arcing gap and extend generally parallel to the longitudinal axis of any arc between the electrodes 25 and 26. These insulating plates are preferably made of a ceramic material that emits very little gas when exposed to an arc. The plates 35 are clamped together against opposite edges of the electrodes 25 and 26 by suitable fastening means such as insulating bolts 37 located at spaced-apart locations around the outer periphery of plates 35.

As seen in FIG. 2, the arc-propelling coil 30 for the upper main gap device is mounted at the lower side of one of the insulating plates 35. This coil is preferably of a circular configuration, as viewed in FIG. 3, and about half of its circumference is disposed generally in alignment with the semicircular outer electrode 25. The arc-propelling coil 30a for the lower main gap device is of substantially the same configuration and is mounted at the upper side of an insulating sidewall 35 of the lower gap device. The two coils 30 and 30a are connected in the circuit in such a manner that when current flows through the two coils, it flows through each of the coils in the same angular direction. Thus, a magentic field 41 surronnding the two coils 30 and 30a and having the general configuration depicted in FIG. 2 is developed.

At all joints along the length of the outer electrodes 25 and 25a, this magnetic field 41 extends across the arcing gap 27 or 27a in a direction generally perpendicular to the longitudinal axis of any arc in the gap. In a known manner, this magnetic field acts on the arcs to drive each in the direction of arrow 32 in FIGS. 1 and 3.

The motion of the arc in the direction 32 of FIG. 3 progressively lengthens the arc due to the progressively increasing length of the gap 27. This progressive lengthening of the arc produces a progressive increase in arc voltage, which progressively reduces the arcing current and eventually extinguishes the arc, as will soon be explained.

For protecting the arc-propelling coils 30 and 30a against the high voltages than can be developed thereacross by a sudden flow of high curent through the coils, we provide an auxiliary gap device 50 in parallel with these two coils. When the voltage across these two coils 30 and 30a reaches a predetermined level, this auxiliary gap device 50 arcs-over, shunting current around the coils and thus limiting the voltage across the coils. The auxiliary gap 50 can be constructed in the same manner as the other two gap devices. In this respect, it comprises electrodes 51 and 52 mounted between insulating sidewalls 35. These electrodes 51 and 52 are of essentially the same shape and size as the electrodes of the main gap devices. Preferably, the auxiliary gap device is physically located between the two main gap devices, as may be seen in FIG. 2.

It is not intended that the auxiliary gap device 50 arc-over in response to very small currents flowing through coils 30 and 30a. Only when the current flowing through loop-shaped path L is high enough to drive the arc out of its arc-initiation position G without the assistance of the arc-propelling coils 30 and 30a do we allow an arc-over of the auxiliary gap 50 to occur. This is controlled by appropriately setting the arc-over voltage of the auxiliary gap 50.

By virtue of limiting the voltage across the arc-propelling coils, the auxiliary gap 50 also limits the over-all voltage across the surge suppressor. This is desirable because the maximum voltage across the suppressor must not exceed the surge voltage rating of the converter equipment 14 at all times during the transient condition.

Briefly summarizing the operation of the suppressor 16, assume that the two gaps 22 and 24 have arced-over in response to a voltage surge appearing across buses 10, 12. Surge current flows through the series combination of the two gap devices 22 and 24 and the two arc-propelling coils 30 and 30a. Assuming this current is high, the auxiliary gap 50 arcs-over, removing the two coils from the surge-dissipating circuit. This reduces the magnetic field available for driving the arc in the direction of arrow 32, but there is enough magnetic force derived from current flowing through the loop-shaped path L of FIG. 1a to drive the arc from the arc-initiation region into the arc-running region. This progressively lengthens the arc, producing a progressive increase in arc voltage, which progressively reduces the arc current. When the arc voltage exceeds the voltage applied by the system to the gap, the arcing current will rapidly approach zero. If the energy of the voltage surge that initiated the arc has then been dissipated in the suppressor and the resistor 20, the arc will be extinguished and no further breakdown of the gap will occur, thus enabling the system to be restored to normal operation.

If a high energy voltage surge is being dissipated, only a small portion of the surge energy will have been dissipated by the time the arcing current is driven toward zero by the high arc voltage. As a result, the remaining surge energy will cause each of the gaps to arc-over again at the location G. Upon initiation of the second arc, the first arc vanishes. The second arc, like its predecessor, is driven in the direction of arrow 32 into a position, such as 59 (FIG. 3), near the other end of the electrodes, thereby increasing the arc voltage and driving the arc current rapidly toward zero. Just before or as soon as the current reaches zero, the surge voltage resulting from the remaining surge energy initiates a third arc in the arc-initiating region 28. The second arc vanishes, and the third arc is handled in the same manner as its predecessor. This sequence of events is repeated over and over again until the surge energy is finally completely dissipated. When this complete dissipation occurs, the maximum arc voltage developed when the arc is in its position 59 at the end of the electrodes is insufficient to cause a breakdown at the arc-initiation region G, and hence the gap acts thereafter to prevent further current flow.

When the current through the suppressor falls to a predetermined low value after the energy of the voltage surge has been partially dissipated, the auxiliary gap 50 will stop arcing, causing the current to be totally transferred to a path through coils 30 and 30a. The arc-propelling coils 30 and 30a are thus able to remain in the circuit during this final portion of the operation to assist in extinguishing the arc in the main gaps.

In order to protect the arc-initiation region 28 of the gap from a high current arc which might bow beyond the position 59 (FIG. 3), we provide an insulating barrier 57 that extends across one end of the arc-initiation region 28 between the position 59 and the arc-initiation region. This barrier prevents the long arc at 59 from reaching the arc-initiation region and damaging it, as by burning the sharp edges 29 that are used for corona-generation. Note that the barrier 57 is located near the arc-initiation region and relatively remote from the opposite end of the electrodes to still permit a substantial bowing of the arc, as indicated at 59.

To permit use of a minimum number of series-connected gap devices for protecting a D-C circuit of a given voltage, it is desirable that the voltage under steady-state conditions be distributed substantially uniformly between the gap devices, thereby minimizing the chances for an unintentional breakdown of the gap devices. For obtaining this uniform voltage distribution, we connect a steady-state voltage divider 60 (FIG. 1) across the two buses 10 and 12. This voltage divider 60 comprises the series combination of two resistors 62 and 64 of substantially equal resistance. These resistors 62 and 64 are respectively connected across the two main gap devices 22 and 24. In this respect, a conductor 65 is connected between the juncture of the two resistors 62 and 64 and the juncture of the two gap devices 22 and 24. Under steady-state conditions, substantially equal voltages appear across the resistors 62 and 64 and hence across the gap devices 22 and 24. The resistors 62 and 64 have a very high resistance, for example about one to five megohms each so as to minimize the power dissipated in them under steady-state conditions.

When a voltage surge appears across buses 10, 12, it is desirable that the suppressor consistently arc-over when the voltage exceeds a predetermined value. In many applications this predetermined value must be a relatively low multiple of the steady-state voltage, e.g., less than twice steady-state voltage. To assure consistent arc-over at this predetermined surge voltage, we provide for a highly non-uniform voltage distribution that assures rapid sparkover of one of the gaps at the predetermined surge voltage. This highly non-uniform voltage distribution under surge conditions is obtained by a transient voltage divider 70 that comprises the series combination of two capacitors 71 and 72 and two resistors 73 and 74, all connected in series across the two buses 10 and 12. One section of the transient voltage divider comprises the series combination of resistor 73 and capacitor 71, and this section is connected across the upper gap device 22. The other section of the transient voltage divider comprises the series combination of resistor 74 and capacitor 72, and this section is connected across the lower gap device 24. For connecting these components across the respective gap devices, the conductor 65 is utilized for connecting the juncture 77 of the two gap devices to the juncture 78 of the two sections of the transient voltage divider. The juncture 78 may also be considered the juncture of the two voltage-dividing capacitors 71 and 72.

In a preferred embodiment, the resistor 73 is small compared to the resistor 74, and the capacitor 71 is large compared to the capacitor 72. For example, the resistor 73 has a resistance of one-tenth that of resistor 74; and the capacitor 71 has a capacitance of ten times that of capacitor 72. The resistors 73 and 74 have resistances that are very low in comparison to that of resistors 62 and 64.

When a surge voltage appears across the buses 10, 12, the effective impedance of the capacitors 71 and 72 to current flow through the transient voltage divider 70 drops sharply. This results in much more current flowing through the transient voltage divider 70 than through the steady-state voltage divider 60 under the surge conditions. Since the lower resistor 74 has a resistance of ten times that of upper resistor 73 and since capacitor 72 is only one-tenth as large as the capacitor 71, substantially all of the surge voltage appears across the lower gap device 24. This produces a rapid arc-over of the lower gap device 24 when the surge voltage exceeds the predetermined value for which the gap device 24 has been set. Arc-over of the lower gap device 24 causes the voltage thereacross to collapse, and this results in most of the surge voltage being transferred to the upper gap 22. The upper gap 22 quickly arcs-over in response to the application of this voltage, thus completing a low impedance surge-dissipating circuit through the series combination of the two gap devices 22 and 24.

It is important that the gap device 24 which arcs over first not extinguish its arcs before the other gap device 22 arcs-over. This is the case because should gap 24 extinguish its arc before arc-over of the other gap, then it will reassume some of the surge voltage, thus partially relieving the other gap 22 from voltage stress and decreasing the chances for its immediate breakdown. This problem is accentuated when a large number of gaps are connected in series since the time elapsing between arc-over of the first gap and arc-over of the last gap is longer, and there is thus more opportunity for the first gap to clear before complete arc-over of the string of gaps. This situation is particularly relevant for surges with relatively slow wave fronts.

To assure that once the gap device 24 arcs over, it will continue to arc until any remaining gap device, such as 22, arcs over, we connect a damping resistor 80 in circuit with conductor 65. The manner in which this resistor 80 functions is as follows. When the lower gap device 24 arcs-over, the current that immediately flows through the arc is derived from the capacitor 72. This capacitor 72 discharges through a discharge circuit that comprises the series combination of resistor 74, resistor 80, arc-propelling coil 30a, and the gap device 24. In the absence of damping resistor 80, this would be an oscillatory circuit with capacitance 72 oscillating with the inductance of coil 30a. But resistor 80 has a high enough resistance to overdamp this circuit. Thus, damping resistor 80 eliminates the oscillations that would otherwise occur. By eliminating these oscillations, we eliminate current zeros in the capacitor discharge current and thus eliminate the opportunity that the gap 24 had to clear on such current zeros. Referring to FIG. 4, the curve $I_O$ illustrates the current that would flow through the discharge circuit in the absence of resistor 80, and the curve $I_R$ illustrates the current that flows therethrough with resistor 80 present. If the remaining gap 22 requires until the instant B to break down, it will be apparent that prior to B several current zeros in the current that would otherwise flow through gap 24 have been eliminated by damping resistor 80.

Consideration was given to making the resistor 74 of a higher resistance in order to provide the above-described over-damping, but this was found to be disadvantageous because it would interfere with the ability of transient voltage divider 70 to divide the surge voltage in the desired manner. In this regard, transient voltage divider 70 is intended to be basically a capacitance-type voltage divider, and increasing the size of resistors 73 and 74 would interfere with its functioning in this manner.

The man purpose of resistors 73 and 74 in the transient voltage divider 70 is to prevent the capacitors 71 and 72 from oscillating with other inductances (not shown) in the power system. In the absence of such resistors, such oscillations could occur under surge conditions and could unduly prolong operation of the suppressor.

For accelerating the application of voltage to the second gap 22 following spark-over of the first gap 24, a very small capacitor 79 is connected in parallel with the series combination of the two coils 30 and 30a. When the gaps 22 and 24 are intact, no significant voltage is present across capacitor 79, and points 84 and 85 are therefore at the same potential. The capacitor 79 provides a non-inductive connection between points 84 and 85. Thus, when the first gap initially sparks-over, the potential appearing at the lower terminal 18 immediately appears at 84, resulting in substantially the full surge voltage being immediately applied to the second gap 22 to initiate its spark-over. Without the capacitor 79, the points 84 and 85 are interconnected through the inductance of coils 30 and 30a. This inductance reduces the rate at which the potential of point 84 changes to the value at 18 following spark-over of gap 24, consequently lengthening the period required for full surge voltage to appear across upper gap 22 and to initiate its spark-over. A typical value for shunting capacitor 79 is 50 micromicrofarads. A factor that makes it desirable to use the shunting capacitor 79 is the presence of capacitance-type voltage divider 71, 72. The relatively large capacitor 71 tends to temporarily hold the point 84 at the potential existing prior to spark-over of gap 22, but this retarding effect is defeated by the small shunting capacitor 79.

Although we have shown only two gap devices connected in series for protecting the DC circuit, it will be apparent that for higher voltage circuits, a larger number of these gap devices connected in series will be used. For example, referring to FIG. 5 there are shown two suppressors each corresponding to the suppressor 16 of FIG. 1 connected in series. The upper suppressor is the suppressor 16 of FIG. 1 and the lower suppressor is an identical suppressor, designated 16b.

The steady-state voltage divider comprises four high ohmic resistors 62, 64, 62b and 64b of equal value connected in series across the buses 10, 12 and respectively connected across the four gap devices 22, 24, 22b, 24b. The transient voltage divider comprises capacitors 71 and 72 and resistors 73 and 74 identical to those used in FIG. 1 for distributing a voltage surge between the two gaps of the upper suppressor. In the lower suppressor, however, the capacitors 71b and 72b of the lower suppressor are made substantially larger than the capacitors 71 and 72, respectively, of the upper suppressor 16. The lowermost capacitor 72b is also made small compared to capacitors 71b and 71. The resistors 73b and 74b are made small in comparison to resistors 73 and 74, respectively, of the upper suppressor. Resistor 73b is also small in comparison to resistor 74b. By proportioning the capacitors and resistors of transient voltage divider in this manner, most of the surge voltage can be made to appear first across gap 24, assuming all the gaps are intact. But when gap 24 arcs-over, most of the surge voltage then appears across gap 24b. When gap 24b arcs over, most of the surge voltage appears across gap 22. Thus, most of the surge voltage is sequentially applied to the gap devices 24, 24b, 22 and 22b, in that order, to produce a sequential breakdown of these gaps.

As explained hereinabove, the damping resistor 80 acts to prevent the first gap 24 from extinguishing its arc before all of the remaining gaps (in this case, gaps 22, 24, and 22b) arcs-over. This resistor 80 also serves to preclude the gap 22 from extinguishing its arc before the remaining gap 22b arc-over. A similar resistor 80b in the lower suppressor assures that the arc at gap 24b will be maintained until gaps 22 and 22b arc-over.

While we have shown and described particular embodiments of our invention, it will be obvious to those skilled in the art that various changes and modifications may be made without departing from our invention in its broader aspects; and we, therefore, intend in the appended claims to cover all such changes and modifications as fall within the true spirit and scope of our invention.

What we claim as new and desire to secure by Letters Patent of the United States is:

1. A surge suppressor for a high voltage DC circuit that includes a pair of opposite polarity buses, comprising:
   (a) a pair of gap devices,
   (b) a non-linear resistor,
   (c) means for connecting said gap devices and said non-linear resistor in series across said buses,
   (d) a voltage divider for distributing surge voltage appearing across said buses between said gap devices,
   (e) said voltage divider comprising a pair of capacitors connected in series with each other across said buses and means for respectively connecting said capacitors across said gap devices,
   (f) one of said capacitors discharging through the gap device that it is connected across upon initial arc-over of said gap device,
   (g) means for maintaining the flow of current through said arced gap device until the other gap device arcs-over, comprising a damping resistor connected between the juncture of said two gap devices and the juncture of said two capacitors,
   (h) said damping resistor being located out of the path of current flowing through said voltage divider between said buses and out of the path of current flowing through said gap devices.

2. The surge suppressor of claim 1 in combination with:
   (a) an arc-propelling coil connected in series with the first gap device to arc-over,
   (b) a discharge circuit for said one capacitor comprising the series combination of said coil and said damping resistor, said resistor having a sufficiently high resistance to over-damp said discharge circuit.

3. The surge suppressor of claim 1 in which said gap devices are filled with a gas consisting essentially of hydrogen.

4. The surge suppressor of claim 1 in which said one capacitor has a capacitance substantially smaller than the other capacitor to cause most of said surge voltage to appear initially across said smaller capacitor and thereby produce arc-over of the gap device shunted by said smaller capacitor prior to arc-over of the other gap device.

5. The surge suppressor of claim 1 in which:
   (a) each gap device has an arc-initiating region and an arc-running region,
   (b) an arc-propelling coil is provided connected in series with each of said gap devices for producing an arc-moving magnetic field in its associated gap device for moving an arc therein from the arc-initiation region into the arc-running region,
   (c) additional means having an effectiveness varying directly with current through an associated gap device for producing a magnetic force on said arc which moves said arc from said arc-initiation region toward said arc-running region,
   (d) an auxiliary gap connected across said coils and set to arc-over when the current through said coils rises sharply to a predetermined value,
   (e) said predetermined value being sufficiently high that said additional means has sufficient arc-moving ability at said predetermined current to move an arc out of said arc-initiation region without assistance from the associated coil.

6. A surge suppressor for a high voltage D-C circuit that includes a pair of opposite polarity buses, comprising:
   (a) a pair of gap devices,
   (b) a non-linear resistor, (c) means for connecting said gap devices and said non-linear resistor in series across said buses, (d) a first voltage divider for steady-state voltage division comprising a pair of resistors connected in series with each other across said buses and means for respectively connecting said resistors across said gap devices, (e) a second voltage divider for applying a relatively large percentage of the voltage appearing across said gap devices during a voltage surge to one of said gap devices and a relatively small percentage to the other of said gap devices, (f) said second voltage divider comprising a pair of capacitors connected in series with each other across said buses and means for respectively connecting said capacitors across said gap devices, one of said capacitors having a capacitance substantially smaller than the other capacitor to cause most of said surge voltage to appear across said smaller capacitor and thereby produce arc-over of the gap device shunted by said smaller capacitor prior to arc-over of the other gap device, (g) said one capacitor discharging through said first gap device to arc-over to supply current to said gap device for continued arcing, (h) and means for maintaining the flow of current through the first gap device to arc-over until the other gap device arcs-over comprising a damping resistor connected between the juncture of said two gap devices and the juncture of said two capacitors, said resistor being located outside of the path of current flowing through said second voltage divider between said buses and outside of the path of current flowing through the series circuits containing said gap devices after arc-over.

7. A surge suppressor for a high voltage D-C circuit that includes a pair of opposite polarity buses, comprising:

(a) a pair of gap devices, (b) a non-linear resistor, (c) means for connecting said gap devices and said non-linear resistor in series across said buses, (d) means for causing said gap devices to arc-over in response to a surge voltage of a predetermined minimum magnitude appearing across said buses, (e) each gap device having an arc-initiation region and an arc-running region, (f) an arc-propelling coil in series with each of said gap devices for producing an arc-moving magnetic field in its associated gap device for moving an arc therein from the arc-initiation region into the arc-running region, (g) additional means having an effectiveness varying directly with the magnitude of the current flowing through a gap device for producing a magnetic force on said arc which moves said arc from said arc-initiation region toward said arc-running region, (h) an auxiliary gap connected across said coils and set to arc-over when the current through said coils rises sharply to a predetermined value, (i) said predetermined value being sufficiently high that said additional means has sufficient arc-moving ability at said predetermined current to move an arc out of said arc-initiation region without asistance from the associated coil.

8. A surge suppressor for a high voltage D-C circuit comprising:

(a) a pair of spaced-apart main electrodes defining a gap therebetween, (b) each of said electrodes having an arc-initiation portion near one end and an arc-running portion adjacent said arc-initiation portion, c) the arc-initiation portions of said electrodes being relatively close together and the arc-running portions being at progressively greater distances apart proceeding in a direction away from said arc-initiation portions, (d) said electrodes having irregular surfaces at their ends in the arc-initiation region for developing a corona discharge therefrom when the voltage applied between said electrodes exceeds a predetermined value, (e) a region of minimum-spacing between said electrodes spaced from said ends, at which arcs are initiated by radiation resulting from said corona discharge, (f) conductors for carrying current to and from said electrodes, (g) and means for forcing the net current flowing through said electrodes and an arc at said region of minimum-spacing to follow a generally U-shaped path bowing toward said arc-running region, comprising means for electrically connecting said conductors to said electrodes at points offset from said region of minimum electrode spacing and immediately adjacent said ends.

9. A surge suppressor for a high voltage D-C circuit comprising:

(a) a pair of spaced-apart main electrodes defining a gap therebetween, (b) each of said electrodes having an arcing surface of a generally semi-circular form, one of said arcing surfaces extending about the other, (c) the portions of said arcing surfaces near one end of said electrodes constituting arc-initiation portions and the remainder of said arcing surfaces constituting arc-running portions, (d) the arc-initiation portions of said electrodes being relatively close together and the arc-running portions being at progressively greatly distances apart proceeding in a direction away from said arc-initiation portions, (e) means for driving an arc established at said arc-initiation portions along said arc-running portions into a position at the opposite end of said arc-running portions where the arc can bow into a path extending near the arc-initiation portions, (f) and an insulating barrier positioned adjacent said arc-initiation portions and between said arc-initiation portions and said opposite ends of said arc-running portions to prevent the bowing arc from reaching said arc-initiation portions.

10. A surge suppressor for a high voltage D-C circuit that includes a pair of opposite polarity buses comprising:

(a) a pair of gap devices, (b) a non-linear resistor, (c) means for connecting said gap devices and said non-linear resistor in series across said buses, (d) a voltage divider for distributing surge voltage appearing across said buses between said gap devices, (e) said voltage divider comprising a pair of capacitors connected in series with each other across said buses and means for respectively connecting said capacitors across said gap devices, (f) one of said capacitors discharging through the gap device that it is connected across upon initial arc-over of said gap device, (g) an arc-propelling coil connected in series with the first gap device to arc-over, (h) a damping resistor, (i) a discharge circuit for connecting said one capacitor across said first gap device to arc-over comprising the series combination of said coil, said damping resistor, and said first gap device, (j) said damping resistor having a sufficiently high resistance to overdamp said discharge circuit and render the capacitor discharge current substantially non-oscillatory.

11. A surge suppressor for a high voltage D-C circuit that includes a pair of opposite polarity buses, comprising:
(a) a pair of gap devices,
(b) means for connecting said gap devices in series across said buses,
(c) a voltage divider for distributing surge voltage appearing across said buses between gap devices,
(d) said voltage divider comprising a pair of capacitors connected in series with each other across said buses and means for respectively connecting said capacitors across said gap devices,
(e) inductive means comprising an arc-propelling coil electrically connected between said gap devices and in series therewith,
(f) and capacitive means providing a non-inductive shunt connection around said inductive means for accelerating the voltage build-up across one of said gap devices following initial spark-over of the other gap device.

References Cited

UNITED STATES PATENTS

| | | | |
|---|---|---|---|
| 2,135,085 | 11/1938 | Ludwig et al. | 317—70 |
| 3,309,555 | 3/1967 | Lee et al. | 313—156 |

JAMES W. LAWRENCE, *Primary Examiner.*

P. C. DEMEO, *Assistant Examiner.*